PRINTED CIRCUIT SWITCH

Filed May 3, 1956

INVENTORS
Clarence Huetten
Floyd C. Smith
BY [signature]
ATTORNEY

United States Patent Office 2,883,482

Patented Apr. 21, 1959

2,883,482

PRINTED CIRCUIT SWITCH

Clarence Huetten and Floyd C. Smith, Indianapolis, Ind., assignors to P. R. Mallory & Co., Inc., Indianapolis, Ind., a corporation of Delaware Application May 3, 1956, Serial No. 582,362

12 Claims. (Cl. 200—5)

This invention relates generally to electric switches and refers more particularly to miniature rotary tap switches adapted for use in printed circuits.

For many types of applications, it is becoming increasingly desirable to provide a miniature rotary tap switch adapted to control a great many electrical circuits. This is especially important with the development of miniature components for use in exceedingly small physical environments. In the progress of the arts of component miniature circuits, the need for switches incorporating principles of printed circuit techniques becomes ever more pronounced. However, the construction of a subminiature switch utilizing printed circuit techniques presents a great many basic problems which have been substantially overcome in the present invention.

Since, in the construction of the switch, it was determined that it would be of advantage to use a copper-clad laminate sheet as the stator, several special problems were immediately presented. It was decided that the stator should be a separate part or an integral part of the associated printed wiring on a complete card. For the construction of a separate card for the stator, stiff protruding terminations are required for printed circuit applications. In such a construction, the terminals must be securely fastened to the printed contacts on the stator and must withstand the normal forces encountered in assembly and in use of the switch. Heretofore the bond between a plastic sheet and the copper was not satisfactory inasmuch as the copper could be rather easily stripped from the sheet. It was necessary, therefore, to provide an easy to assemble terminal to withstand the forces tending to part the laminate from the copper or printed circuit conductor.

Another difficulty which was presented was that of breaking the electric circuit properly. With regard to this aspect of the problem, the switch, being of non-shorting character, has to withstand the arcing associated with electrical circuit interruption. It is apparent that breaking an electrical circuit adjacent to an insulator may have the effect of destroying the insulation corresponding to the severity and duration of arcing encountered. Thus, if the switch wiper is biased to wipe over the sharp, raw edges of a printed contact portion of a stator laminate, extreme wear of the copper pattern and the wiper may occur and may cause loss of metal plating, which could conceivably cause a considerable increase in interface resistance characteristics. Also, since the printed contacts are relatively thin, bringing the wiper in close proximity to the insulating base, the non-shorting switch could readily cause carbonization of the stator base insulating material. For the above reasons, a switch was necessary where the circuit would be broken, not over the insulation, but over the surface of the printed contact. In such a switch, it is also necessary to allow the wiper shoe to ride over part of the contact to wipe away arc products so that low contact resistance is established and maintained. Thus, a lifting type shoe action is required for such a "raised" printed pattern type of stator.

Another basic problem was that of making the switch super-structure, the detent system and the wipers a complete assembly. It is desirable to have such a complete unit to facilitate mounting of the assembly on a printed stator which would be associated with the remaining circuit pattern. Further, in keeping the switch as small as possible, there is the basic problem of providing for as many poles and contact shoes as possible and also in maintaining high resistance to voltage flashover between the shoes and contacts adjacent to the contacts upon which the shoes rest. Still another obstacle to be avoided relates to the fact that moisture may be readily trapped in confined spaces. Therefore, in the construction of a printed circuit switch it becomes necessary to provide sufficient space between the switch super-structure and the printed stator and between the printed stator and the printed card to which the switch is assembled. This is required in order to prevent the condensation of moisture between conductors or between a conductor and the metallic portions of the switch, so that the insulation resistance will not be greatly affected.

Another fact to be considered is that of having the switch terminals arranged so that there is sufficient space between them in order to prevent any solder from bridging any two adjacent connections. It thus becomes necessary to arrange all the terminals in a circle so that the terminals connecting to the poles of the switch will be just as accessible on each switch position and in order to minimize the number of cross-overs needed in the printed wiring.

The present invention of a miniature rotary tap switch for use with printed circuits has been constructed to overcome the problems discussed above. In the instant switch, the terminals have been uniquely provided in a manner such as to preserve the embossed or printed conductor placed on the laminate or plastic base without stripping the conductor therefrom. These terminals consist of solid headed rivets that have been spiraled at the end next to the head. Thus, when the terminals are pushed into the proper size hole, the spirals cut into the plastic and greatly resist being forced out by the normal forces encountered in assembly.

The problems of breaking the circuit and avoiding destruction of the insulation by arcing and the loss of plating by the shoe wiping over insulation and the raw, sharp edges of the printed contacts have been solved by lifting the shoes off when necessary. The rotor which carries the shoes is a floating type and causes the circuit to be broken in air above the printed contact. The rotor further is constructed so as to include a severality of recesses or pockets placed at substantially 120° from each other. These pockets include individual balls which are adapted to cooperate with a circumferential indexing ring to positively index the switch. At the same time, the balls, as they bear against the teeth included in the ring, will be enabled to move the rotor up and down as the switch is turned from one position to another. Thus, while the shoe is on the contact in the circuit-making position, normal shoe force is maintained. As the rotor is turned, it is caused to rise, thereby decreasing the force of the shoe on the contact. Further rise of the rotor actually lifts the shoe and the circuit is broken in air near the edge of the printed contact on the stator. As the rotor nears the adjacent position, the shoe is lowered onto the next contact. Thus, the base of material may be of inexpensive insulative material and does not have to be of a premium quality, since the shoe does not wipe over it nor break electrical current next to it. This makes the cost of the switch much lower, especially in the case where the stator is an integral part of the associated printed wiring.

The indexing mechanism is closely associated with the lifting action of the shoe. Three equally spaced balls sit in cavities in a molded plastic rotor and roll on a notched indexing ring to provide a positive detent and to cause the rotor and the shoes to be lifted. The contact shoe is U-shaped and is fitted into a narrow slot formed in the rotor. A second narrower slot is superimposed over this slot, into which is placed a V-shaped wire spring to bias the shoe to the rotor. As the rotor is lifted by rotation of the shaft, it comes into contact with the bent-over ears on top of the shoe, causing the shoe to be lifted off the stator. The shoe is designed to equalize the forces on its two contacting areas. A balance of the forces is obtained by making the spring arm press on a raised fulcrum point half-way between the two contact faces. This construction tends to minimize the circumferential space required by the shoe, permitting more shoes to be used in the same size rotor, and provides high resistance to voltage flashover between the shoe and an adjacent contact.

The indexing ring in the mechanism comprises a ring having a plurality of triangular-shaped sawteeth circumferentially positioned thereabout and attached to the casing of the switch. Steel balls are then adapted to roll about the ring, falling within the declivities between the teeth and rolling along the sides thereof to provide a step by step positive indexing.

Spring force is applied by a spring spider of four cantilever arms that are staked to the rotatable shaft to form a resilient mounting for the rotor. To turn the rotor there is provided an actuator which includes a vertical, integrally formed extension adapted to move the rotor about the shaft by means of fitting within a narrow cooperating slot cut therein. The rotor as it turns is thus also allowed to move up and down as the switch arm is rotated. A stop arm is also formed integrally with the rotor actuator to limit its travel in either radial direction by having the arm engage indentations in the side of the metallic casing of the switch.

Moreover, the entire switch super-structure, i.e., all of the switch except the rotor or switch plate and mounting eyelets, is a completely assembled unit with the mode of mounting of the shoes and indexing ring preventing the shoes and indexing mechanism, respectively, and the rotor, from coming out of proper assembly.

It is therefore an object of the present invention to provide a novel, new and improved subminiature rotary tap switch of the non-shorting type which is adapted to be used in printed circuit assemblies.

Still another object of the present invention is to provide an improved switch having unique constructional features of assembly as adapting the same for use in printed electrical circuits.

Another object of the present invention is to provide a rotary switch having particular improvements in the construction of a rotor and contact making means adapted for use with a stator constructed in accordance with printed circuit techniques and having stiff terminals which provide means for connecting the same to associated printed circuits.

Still another object of the present invention is to provide a rotor and wiper assembly in a printed circuit type of switch wherein the wiper makes "floating contact" with the switch contacts in order to prevent flash-over or voltage arcing therein.

Yet another object of the present invention is to provide a printed circuit subminiature switch having a multiplicity of contact circuit stations.

Still another object of the present invention is to provide a subminiature rotary tap electric switch having a molded rotor cooperating with a printed circuit stator having a multiplicity of terminals connected to integrally formed contacts, the contact brushes thereof making with said contacts in a "lifted" manner so as to prevent arcing or flashover between contacts or carbonizing of the plastic stator base.

Another object of the present invention is to provide a new and inexpensive subminiature rotary tap switch adapted for use in printed circuit applications heretofore precluded to such switches and wherein the rotor is of molded construction, including means adapted to resiliently support the same in cooperation with a stator whose contact rings and conductors have been placed thereon in accordance with printed circuit techniques and methods.

Yet another object of the present invention is to provide an efficient rotary type of printed circuit switch incorporating a resiliently mounted rotor, a copper-clad stator having a multiplicity of termini, the contacts connected thereto being raised on said stator so that the wipers of said rotor will be raised above said stator laminate, whereby flashover or arcing between contacts on said stator is precluded.

Another object of the present invention is to provide a printed circuit switch, the components of which lend themselves to automatic fabrication and where unique detenting and indexing is achieved with a minimum of parts.

Further and other objects of the invention may become apparent from a perusal of the disclosure herein. It is to be understood that, while certain specific illustrations are presented, they are not to be considered as limitation except as defined by the spirit of the appended claims, taken in conjunction with the following figures of the drawing, wherein:

Figures 1, 2, 3, 4, 5, 6:
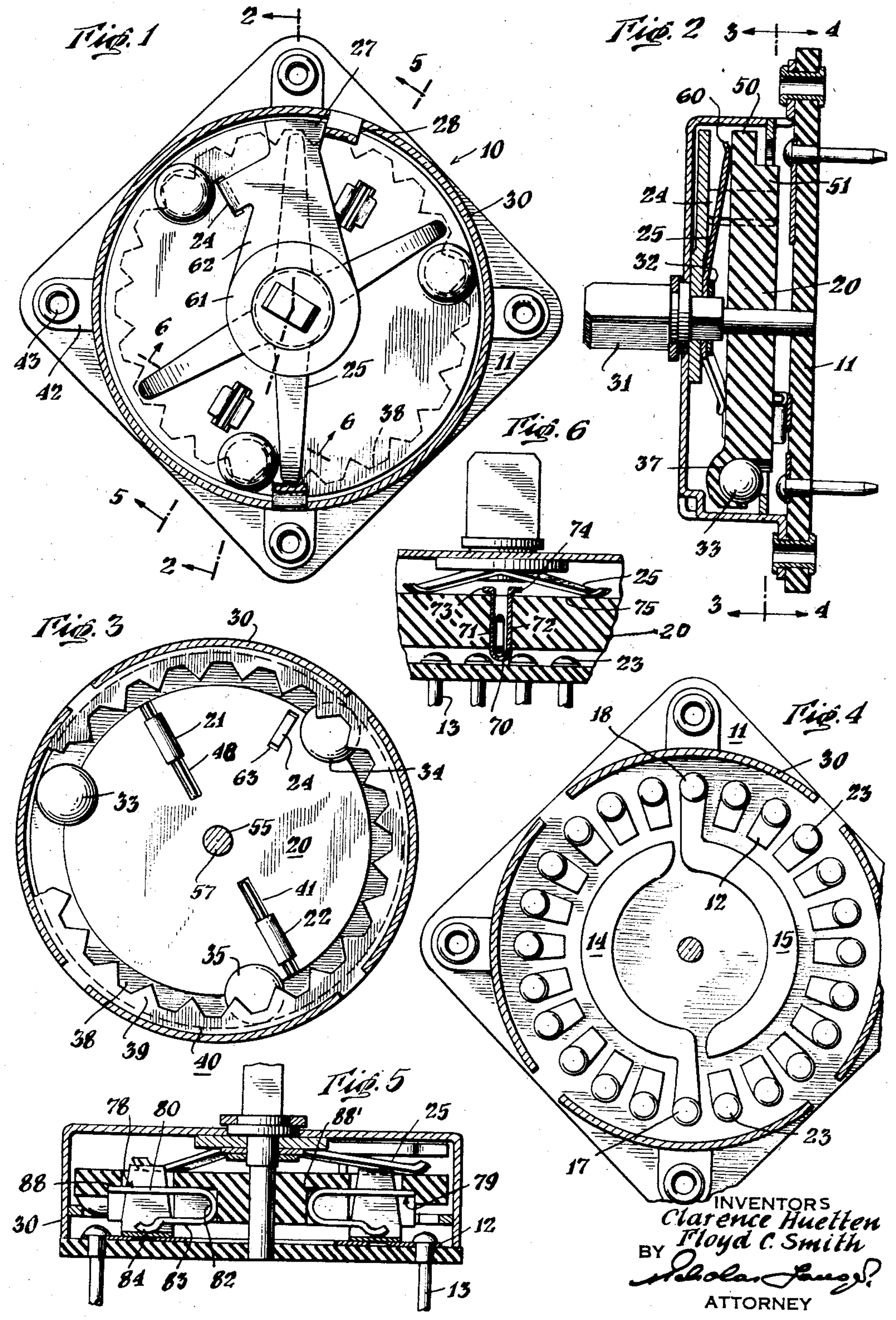
Fig. 1 is a plan view of the subminiature printed circuit switch of the present invention as adapted to illustrate the novel construction and assembly thereof.
Fig. 2 is a vertical, cross-sectional, elevational view of the switch shown in the embodiment of Fig. 1 and as taken along line 2—2 thereof.
Fig. 3 is a horizontal view of the switch as adapted to illustrate the cooperative arrangement between the rotor and the detenting mechanism and as taken along line 3—3 of Fig. 2.
Fig. 4 is a horizontal view of the switch as adapted to show the stator construction therein and as taken along line 4—4 of Fig. 2.

Fig. 5 is a cross-sectional, elevational view of the switch as particularly adapted to illustrate the relationship and mounting of the rotor to its associated stator and to depict the mode of construction of the wipers as being resiliently retained in said rotor and as taken along line 5—5 of Fig. 1; and Fig. 6 is a cross-sectional, elevational view taken along line 6—6 of Fig. 1 as adapted to illustrate the lifting action of the wipers in making electrical connection with the contact terminals of the switch.

In the figures, the same reference numerals are to be taken as denoting structure having the same functional characteristics.

Generally speaking, the printed circuit switch described herein is a two pole, 12 position miniature switch that utilizes a copper-clad, laminated plastic sheet with a plurality of printed contact strips for the stator. It is especially constructed for printed circuit applications in which the components are assembled by one mass solder dip operation to a prefabricated conductor pattern on a perforated insulating base. Stiff protruding terminals are thus provided. Moreover, electrical connection to the contacts is made by a "lifting" wiper construction to prevent arcing between contacts or carbonizing the laminate.

Positive detenting is obtained through the utilization of a circumferentially notched ring, held by means of tongues fitting into grooves formed in the switch casing, comprising a multiplicity of triangular shaped, spaced sawteeth. The spaces or pockets between the teeth are adapted to accommodate indexing rollers or balls held in recesses formed in a surface of the molded rotor. As the rotor is turned by the shaft to the individual positions of the switch, the balls will fall within the spaces between the teeth to define accurate and positive indexing.

The rotor is resiliently mounted and is of a two-level, annular, molded construction, one level being of greater diameter than the other. Between the levels are formed recesses for containing a plurality of indexing or rolling balls, as described above, for detent and indexing purposes. Included in slots formed in the rotor is a novel contact brush arrangement whereby contact wiping occurs in a raised or lifted manner above the laminate stator having the contacts and printed circuits placed thereupon. This type of wiping prevents arcing, flashover or carbonizing of the plastic laminate, as stated above.

Referring now to the drawing, the figures are directed toward showing the cooperative construction and arrangement of the components of the switch. Switch 10 comprises a base 11 made of phenolic laminate upon which is formed a severality of conductors 12 radially placed thereon by printed circuit techniques. Thse conductors are adapted to be connected to stiff, vertically extending contact terminals 13. A pair of other conductors 14 and 15 are configured as imprinted semicircular ground rings connected to oppositely disposed pole contact terminals 17 and 18. The switch includes a rotor 20 and a plurality of contact wipers 21 and 22 resiliently held therein to make electrical connection with rivet contacts, such as 23, set into laminate and to which the imprinted conductors are joined. The rotor is rotated by means of a rotor actuator 24, which is assembled together with a plurality of resilient indexing arms 25. The actuator is integrally connected to a stop arm 27, which, in cooperation with strikeouts 28 in the switch casing 30, is adapted to limit the amount of travel of the rotor. The actuator, stop arm and indexing springs are mounted as a unit on the shaft 31. Again, the rotor is mounted to the shaft sub-assembly, which includes the indexing spring and the rotor actuator staked thereto by means of a washer 32. The rotor actuator is adapted to turn the rotor and index the same on movement of the shaft. The positive indexing is accomplished by allowing a plurality of equally spaced indexing balls 33, 34 and 35 to move circumferentially within cavities 37 formed to contain them in the rotor thereof. The rotor sub-assembly thus in turn comprises the rotor, the indexing cavities, the indexing balls, the contact shoes and springs therefor. The indexing balls have a diameter such that they will fall within spaces 38 established between teeth 39 of indexing ring 40 to give a step by step indexing arrangement.

As seen, the stator 11 for the switch 10 comprises a switch plate including radially imprinted contact conductor strips and concentrically disposed ground rings connected to contacts. The contact shoes or wipers, which are held within grooves 48 and 41, cut in a surface of the rotor, slide over the contacts in a manner such that they are lifted above the laminate between contacts to prevent arcing or flashover therebetween. This is so because, as explained previously, the rotor, in which the wipers are held, is caused to be moved up and down in accordance with the position of indexing balls 33 included in the several recesses 37 of the rotor. These balls, acting in cooperation with indexing ring 40, are adapted to lift the rotor and in turn the wipers held therein so that any flashover between contacts will be prevented. A casing or cover 30 is adapted to fit over the rotor and to be seated on the stator plate and to be tightly mounted thereagainst by means of a plurality of eyeleted ears 42 through which rivets 43 are placed to join the casing to the base.

The rotor comprises two integrally joined levels 50 and 51, formed as a unitary molded, annular structure carrying indexing balls 33 within recesses 37 formed between the levels at approximately 120° from each other. A central aperture 55 is formed through the rotor to accept a portion 57 of the switch shaft. The rotor is supported on cantilever type, resilient arms of indexing springs 25, each of which has a flare 60 adapted to support the under surface of the rotor. The stop arm 27, being beneath the springs and staked to the shaft by means of a disc or washer 32, has a central portion 61 and an arm portion 62 from which there vertically extends an actuator tab 24 adapted to move the rotor upon actuation of the shaft. The actuator tab is adapted to fit within an actuator slot 63 formed in the rotor. The contact wipers 21 and 22 for the rotor 20 fit within long slots 48 and 41 formed through the rotor. The wipers are of a U-shaped, bowed construction, having a bowed mid-section 70 connected to two parallel wall sections 71 and 72. The free ends 73 and 74 of the wipers are right-angled to form ears which are adapted to grip the under surface 75 of the rotor. Each of the wiper shoes has individual tensioning springs 78 and 79 adapted to keep the wiper properly biased in making contact on rotation of the shaft. The spring in each wiper is of generally V-shaped construction with a first straight portion 80, a central bowed portion 82, a second straight portion 83 and a fulcrum portion 84 integrally attached thereto in the nature of a finger. The spring is held in the wiper by being compressed within opposing shoulders 88 and 88' formed in the rotor. A balance of wiping forces is obtained by making the spring arm press on a raised fulcrum point half-way between the two contact faces. This design tends to minimize the circumferential space required by the shoes, permitting more shoes to be used in the same size rotor, and provides high resistance to voltage flashover between the shoe and adjacent contact. It is to be pointed out, too, that the actuator tab moving within its slot cooperates with the resilient mounting of the wipers and indexing spring to allow the rotor to move up and down. Further, as stated, stop indentations have been formed in the casing to cooperate with the stop arm to limit the rotary excursion of the rotor.

It is apparent from the description above that all of the components of the subject switch are facilely assembled to give a new and improved structure wherein all the parts are uniquely mounted to give contact make-and-break features and efficiency heretofore absent from previous devices and wherein prolonged life for the switch is obtained thereby. It is therefore intended that these features be given their proper scope in analogous structure and devices and that the scope thereof be gathered from the claims below.

We claim:

1. An electric switch comprising a stator base having a plurality of separate conductors radially placed thereon, a pair of semicircular imprinted ground ring conductors placed annularly within said radially disposed conductors, rigid contact terminals connected to said conductors to define a plurality of switch positions, a rotor having contact shoes biased to make connection with said contacts, ball and indexing means lifting said contact shoes away from said base to avoid arcing between adjacent contacts, and detent means for positively indexing said switch.

2. An electric switch comprising a laminate stator base having a plurality of separate printed conductors radially placed thereon, a pair of semi-circular imprinted ground ring conductors placed annularly within said radially disposed conductors, contact terminals connected to said conductors to define a plurality of switch positions, a rotor containing slots having contact shoes spring biased thereon to make resilient connection with said contacts, a shaft, actuator means on said shaft falling within a slot in said rotor to move said rotor with said shaft, the rotor thus adapted to move up and down on said actuator, said contact shoes thereby adapted to be lifted away from said base to avoid arcing between adjacent contacts, and detent means for positively indexing said switch.

3. An electric switch comprising a plastic stator base having a plurality of separate conductors radially printed thereon, a pair of semi-circular imprinted ground ring conductors placed within said radially disposed conductors, rigid contact terminals connected to said conductors to define a plurality of switch positions, a molded rotor having U-shaped contact shoes resiliently biased to make connection with said contacts, ball and indexing means lifting said contact shoes away from said base to avoid arcing between adjacent contacts, a casing for said switch, said casing having a circumferential ring including a multiplicity of indexing teeth mounted thereon, and indexing balls carried by said rotor cooperating with said ring on said casing for positioning said rotor.

4. A miniature multi-position electric tap switch comprising a plastic stator base having a plurality of separate conductors radially printed thereon by printed circuit processes, a pair of semicircular imprinted ground ring conductors placed annularly within said radially disposed conductors, rigid contact terminals connected to said conductors to define a plurality of switch positions, a rotor having contact shoes resiliently biased with springs to make good electrical connection with said contacts, rollers contained in recesses formed in said rotor, said contact shoes adapted to be lifted away from said base to avoid arcing between adjacent contacts, said rotor being resiliently mounted on a plurality of cantilever springs, a shaft for said switch having said springs staked thereto, a rotor actuator also connected to said shaft, said rotor having a slot to accommodate the same so as to be moved thereby on the turning of said shaft while also being able to have vertical movement, a casing for said switch having struck-out portions, a stop means connected to said actuator to limit the radial movement thereof by meeting said struck-out portions of said casing, and cooperative detent means on said casing and said rotor for positively indexing said switch upon rotation of said shaft.

5. An electric switch comprising a base having a plurality of separate conductors placed thereon, contacts being connected to said conductors, a rotor having contact shoes adapted to wipe said contacts and to break contact therewith above said base by being lifted thereabove by means of rollers recessed in said rotor to give a vertical floating action of said rotor so as to prevent flashover between said contacts, and means adapted to positively circumferentially index said rotor with respect to said contacts upon turning said rotor.

6. An electric switch comprising a base having a plurality of separate imprinted conductors placed thereon, contacts being connected to said conductors, a rotor of annular configuration having resilient contact shoes vertically movable therein to wipe said contacts and to break contact therewith above said base by being lifted thereabove by means of rollers recessed in said rotor to give a vertical floating action of said rotor so as to prevent flashover between said contacts, and detent means adapted to positively circumferentially index said rotor with respect to said contacts upon turning said rotor.

7. A miniature rotary tap electric switch comprising a base having a plurality of separate imprinted conductors placed in a circle thereabout, contacts being connected to each of said conductors respectively for defining a plurality of switch positions, a rotor having rollers contained in recesses formed therein and having contact shoes of bowed configuration adapted to wipe said contacts by its bowed section and to break contact therewith above said base by being lifted thereabove by floating action of said rotor so as to prevent flashover between said contacts, and detent means adapted to positively circumferentially index said rotor with respect to said contacts upon turning said rotor.

8. An electric switch comprising a stator having a plurality of radially disposed separate conductors placed annularly thereabout, contacts placed against said base on said conductors, a pair of ground rings concentrically disposed within said annularly disposed conductors, a molded rotor having rollers contained in recesses therein and having contact shoes adapted to resiliently wipe said contacts and to be lifted above said base by floating action of said rotor so as to prevent flashover between said contacts, means adapted to positively circumferentially index said rotor with respect to said contacts upon turning said rotor, and stop means defining the radial excursion of said rotor.

9. An electric switch comprising a stator having a plurality of conductors and ground rings imprinted thereon, electrical connectors therefor, a rotor having wipers adapted to resiliently move against said conductors and ground rings, a shaft for said switch, said rotor having rollers contained in recesses contained therein and being mounted on springs connected thereto, a rotor actuator also connected to said shaft to turn in cooperation therewith, said rotor adapted to move vertically with respect to said actuator while turning said rotor, stop means for limiting the rotation of said rotor, a casing for said switch, ring indexing means thereon, rollers included by said rotor acting in conjunction with said indexing means to positively move said switch in a step by step manner.

10. An electric switch comprising a stator having a plurality of conductors and ground rings imprinted thereon, electrical connectors therefor, a molded multi-leveled rotor having recesses therein adapted to contain indexing balls, wipers contained in slots formed in said rotor adapted to resiliently move therein against said conductors and ground rings, a shaft for said switch, a rotor actuator connected to said shaft to turn in cooperation therewith, said rotor adapted to move vertically with respect to said rotor actuator while turning said rotor, stop means for limiting the rotation of said rotor, a casing for said switch, indexing means thereon, means included by said rotor acting in conjunction with said indexing means to positively move and switch in a step by step manner.

11. A multi-positioned electric switch comprising a copper-clad laminated plastic stator base in the form of a plurality of radially spaced conductors and ground rings imprinted thereon, electrical terminals therefor, a molded rotor having wipers adapted to resiliently move against said conductors and ground rings, a shaft for said switch resiliently supporting said rotor on a plurality of springs connected thereto, a rotor actuator connected to said shaft to turn in cooperation therewith, said actuator being a tab adapted to be positioned within a slot in said rotor while turning said rotor, stop means for limiting the rotation of said rotor, a casing for said switch, circumferential indexing means containing a plurality of spaced teeth thereon, roller means included in recesses formed in said rotor acting in conjunction with said indexing means to positively move said switch in a step by step manner.

12. An electric switch comprising a stator having a plurality of conductors and ground rings imprinted thereon, electrical connectors therefor, a rotor having wipers adapted to resiliently move against said conductors and ground rings, said rotor further comprising a plurality of interconnected molded levels of differing diameters, recesses formed therebetween in said rotor at equi-distant spots adapted to contain rollers therein, a shaft for said switch, a rotor actuator connected to said shaft to turn in cooperation therewith, said rotor adapted to move vertically with respect to said rotor actuator while turning said rotor, stop means for limiting the rotation of said rotor integrally joined to said actuator, a casing for said switch, indexing means thereon, means included by said rotor acting in conjunction with said indexing means to positively move said switch in a step by step manner.

References Cited in the file of this patent

UNITED STATES PATENTS

| | | |
|---|---|---|
| 2,075,436 | Grossman et al. | Mar. 30, 1937 |
| 2,297,652 | Henry | Sept. 29, 1942 |
| 2,508,101 | Crowley | May 16, 1950 |
| 2,604,554 | Jacobi | July 22, 1952 |
| 2,675,436 | Frerer | Apr. 13, 1954 |
| 2,678,985 | Smith | May 18, 1954 |
| 2,710,323 | Andrews | June 7, 1955 |
| 2,817,722 | Johnson | Dec. 24, 1957 |
| 2,821,580 | Black | Jan. 28, 1958 |